United States Patent [19]

Vetter et al.

[11] Patent Number: 4,672,507
[45] Date of Patent: Jun. 9, 1987

[54] ELECTRICAL WOUND CAPACITOR WITH REDUCED SELF-INDUCTANCE

[75] Inventors: Harald Vetter, Regensburg; Friedewald Schreiber, Steinheim, both of Fed. Rep. of Germany

[73] Assignee: Siemens Aktiengesellschaft, Berlin & Munich, Fed. Rep. of Germany

[21] Appl. No.: 776,159

[22] Filed: Sep. 13, 1985

[30] Foreign Application Priority Data

Oct. 4, 1984 [DE] Fed. Rep. of Germany ....... 3436425

[51] Int. Cl.⁴ .............................................. H01G 4/38
[52] U.S. Cl. .................................................. 361/329
[58] Field of Search ........... 361/328, 329, 330, 433 H, 361/433 T, 433 V, 433 W

[56] References Cited

U.S. PATENT DOCUMENTS

| 3,302,082 | 1/1967 | Preissinger | 361/329 |
| 3,308,359 | 3/1967 | Hayworth | 361/330 |
| 3,559,007 | 1/1971 | Blank | 361/329 |
| 3,803,457 | 4/1974 | Yamamoto | 361/433 |
| 4,298,906 | 11/1981 | Elias | 361/433 |

FOREIGN PATENT DOCUMENTS

| 518497 | 2/1931 | Fed. Rep. of Germany . |
| 1087278 | 8/1960 | Fed. Rep. of Germany . |
| 3319373 | 11/1984 | Fed. Rep. of Germany . |
| 1338786 | 8/1963 | France . |
| 2127237 | 10/1972 | France . |
| 2129242 | 10/1972 | France . |

Primary Examiner—Donald A. Griffin
Attorney, Agent, or Firm—Hill, Van Santen, Steadman & Simpson

[57] ABSTRACT

An electrical wound capacitor has a winding positioned on a core tube positioned in a housing. Outer terminals are connected to electrodes of the capacitor winding via terminal elements in an interior of the housing. The terminal elements are radially-symmetrically disposed and substantially congruent above one another, are symmetrical relative to one another, and are electrically insulated from one another.

13 Claims, 4 Drawing Figures

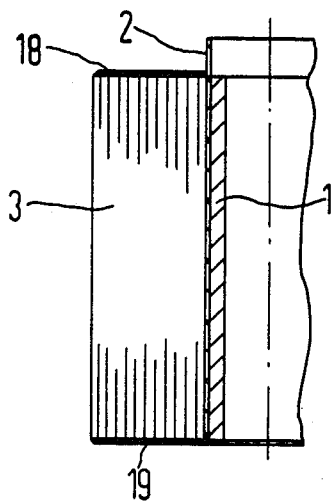
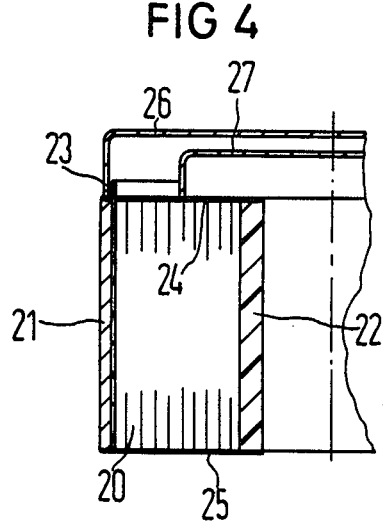

ELECTRICAL WOUND CAPACITOR WITH REDUCED SELF-INDUCTANCE

BACKGROUND OF THE INVENTION

The invention relates to an electrical paper capacitor with reduced self-inductance which is built into a housing, a winding of which is disposed on a core tube, and external terminals of which are connected to the electrodes via terminal elements positioned in the inside of the housing.

In such capacitors, the self-inductance is proportional to the layer width. Added thereto is the inductance of the terminal elements from the winding up to the contact plane of the external terminals. Typical values lie between 1 and 3 nH/mm inductance per length unit, whereby standard terminal line lengths are contained in this value range. Given a layer width of about 60 mm, capacitors with a winding, given a standard connection, have a self-inductance of about 100 nH. Structures formed of a plurality of windings interlaced with one another lie considerably above this value.

There are applications, for example given employment as a damping capacitor for GTO thyristors (gate turn-off), where these values of inductance are too high. Damping capacitors are AC capacitors which are connected parallel to semiconductor components and suppress or damp undesired voltage peaks thereacross. For this purpose, an optimally low self-inductance of the damping capacitor is required, particularly given new semiconductor components such as, for example, GTO thyristors.

SUMMARY OF THE INVENTION

An object of the present invention is to specify a capacitor of the type initially cited which has a reduced self-inductance in comparison to traditional capacitors.

This object is achieved in that the terminal elements are positioned in radial-symmetrical fashion and essentially congruent above one another. They are symmetrical relative to one another and are electrically insulated from one another.

The terminal elements are advantageously designed as strip lines or as caps.

The capacitor can be formed, for example, of sub-capacitances wound concentrically on one another, connected in series, and separated by insulating separating foils. Also the capacitor can comprise a metallic core tube which serves as a coaxial return line of the one capacitor terminal. A metal foil on the outer generated winding surface is also suitable for this purpose.

A further advantageous technique for reducing the self-inductance is to position the electrodes in the capacitor winding such that an inner series circuit with $C_n$ (n even) sub-capacitances results. This produces lower inductance values than a series winding connection and also produces a lower series resistance ($R_s$). The terminating disk can be designed as a partially metalized epoxy resin wafer, whereby the metallization is situated at the inside in the region of the terminals and in the edge region. Furthermore, the terminating disk can be bonded or soldered to the housing.

BRIEF DESCRIPTION OF THE DRAWINGS

FIG. 3 is a capacitor comprising a metallic core tube; and

FIG. 4 is a capacitor having an outwardly disposed metal film.

DESCRIPTION OF THE PREFERRED EMBODIMENTS

Figure 1:
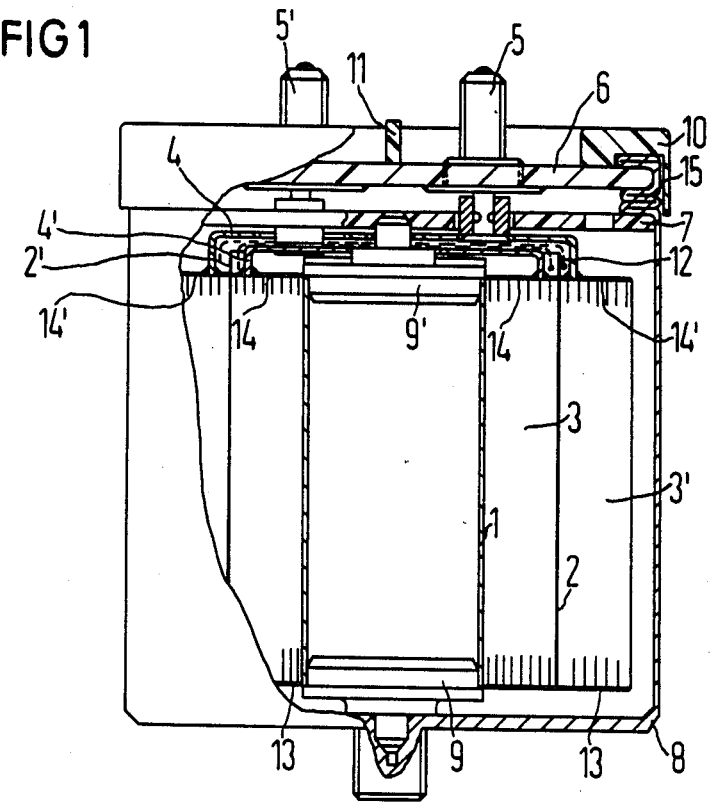
FIG. 1 is a partial section of a capacitor of the invention.

FIG. 1 shows a section through a capacitor which is wound on a core tube 1. The self-inductance of the capacitor winding is reduced since the capacitor winding is formed of two sub-windings 3, 3' which are concentrically wound on the core tube 1, and are separated from one another by insulating separating foils 2, 2'. The sub-capacitances 3, 3' are connected to one another via the end contact layer 13, and are thus connected in series.

Metallic cup-shaped connection caps 4, 4' are radially-symmetrically contacted at the end contact layers 14, 14' separated from one another by the insulating separating foils 2, 2'. The two connecting caps 4, 4' are positioned symmetrically relative to one another with the smallest possible spacing, and lie centrally of a central winding axis of the capacitor winding. A particularly low-inductive line to the external terminals 5, 5' results due to this design. At the same time, a further reduction of the series resistance ($R_s$) results.

The two metallic terminal caps 4, 4' are electrically insulated from one another by an insulating cap 12. The centering plate 7, which guarantees that the winding is centrally positioned in the cup, can be eliminated, given a small winding diameter. The inner terminals (terminal caps or strip lines) are then directly soldered to the terminating disk 6.

The capacitor is centrally incorporated in the housing 8 by centering disks 9, 9' positioned in the core tube 1. The outer terminals 5, 5' are situated in the terminating disk 6.

The terminating disk 6 is formed of an epoxy resin wafer fibre - glass-reinforced under given conditions, as disclosed in German OS No. 33 19 373, incorporated herein by reference, and whose thermally linear coefficient of expansion is matched to the material of the housing 8. The terminating disk 6 preferably comprises a partial metallization which, for example, is obtained by reactively etching a copper lamination off. The metallization is situated on the inside of the terminating disk 6 in the region of the outer terminals 5, 5' and is electrically conductively connected to these terminals 5, 5' so that the inner terminal elements (caps 4, 4' or strip lines) can be soldered on here.

Situated at the closure of the capacitor cup 8 are an insulating ring 10 and an insulating web 11 positioned between the two outer terminals 5, 5'. The spacing of the outer terminals 5, 5' is defined by the necessary insulation.

In order to obtain low values of inductance, it is advantageous to dimension the spacing between terminating disk 6 and the inner terminals (terminal caps 4, 4' or strip lines) as short as possible.

Crimps 15 are positioned in the wall of the capacitor cup 8, whereby an overpressure break-away fuse (not shown in FIG. 1) can be actuated, so that the capacitor reliably shuts off and does not burst given impermissable overloads. The shut-off is advantageously provided in bipolar fashion.

The inside and/or outside of the terminating disk 6 can have a further, partial metallization in the region of the crimps 15. The terminating disk 6 can also be bonded to the housing 8. This, for example, occurs with an anaerobic one-component glue, or with a two-component glue on the basis of an epoxy resin. If the housing 8 is formed of solderable material, the terminating disk 6 can also be soldered to the housing 8.

Figure 2:
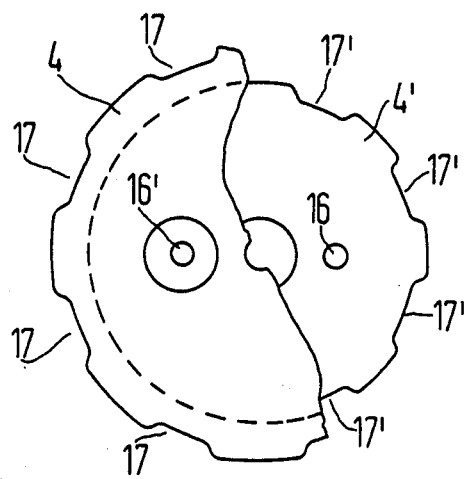
FIG. 2 is a plan view of a metallic terminating cap.

FIG. 2 shows a plan view of the metallic terminal caps 4, 4' in a partially broken view. The bores 16, 16' are provided for the connecting line to the outer terminals. In order to improve the solder contacting, clearances 17, 17' can be formed at the circumference of the caps. These clearances 17, 17' can, for example, be punched.

The embodiment of a low-inductive, bipolar capacitor shown in FIGS. 1 and 2 has an overall inductance of <30 nH up to the outer terminals 5, 5'. The layer width amounts to 66 mm, including the Schoopage layers. The spacing between the Schoopage layer contact plane and the outer terminal amounts to about 17 mm. A comparable, conventionally constructed capacitor, by contrast, has an overall inductance of >100 nH.

FIG. 3 shows an embodiment wherein the concentric return line occurs via a metallic core tube 1. The core tube 1 is electrically insulated from the winding 3 by a insulating separating foil 2. The metallic core tube 1 is composed, for example, of brass. Given this embodiment, the terminal elements are radially-symmetrically positioned. They are positioned symmetrically relative to one another, and are positioned in this fashion both at the Schoopage layer 18 and at the metallic core tube 1. The winding 3 is connected in series with the metallic core tube 1 via the Schoopage layer 19.

FIG. 4 shows an embodiment wherein a metal film 21 positioned on the generated surface of the capacitor winding 20 serves as a concentric return line. In this case, the winding 20 is formed on an insulating core tube 22 of, for example, hard paper, and is insulated from the metallic film 21 by an insulating separating film 23. The separating film 23 also serves for insulating the metal foil 21 from the end contact layer 24. The other end face of the winding 20 is contacted by the Schoopage layer 25. Metallic terminal elements 26, 27 are radially-symmetrically secured to the end contact layer 24 and to the metal foil 21.

In addition to the embodiments shown in the figures comprising cap-shaped terminals, strip lines or modifications thereof (for example parallel conductor) are also suitable as connecting elements. However, less favorable values of the series resistance ($R_s$) must be accepted, to a certain degree.

The electrodes of the capacitor are formed, for example, of regenerably thin metal layers on dielectrically effective plastic films. Furthermore, the electrodes can be positioned on both sides of a carrier material, for example paper, and can be electrically connected to one another, so that the electrode carrier is situated in the field-free space. Known plastic materials such as, for example, polypropylene, polycarbonate, or polyethylenetherephthalate are suitable as a dielectric. It is also advantageous for certain uses to impregnate the capacitor winding with an insulating fluid.

In addition to the end-contacted capacitors shown in the exemplary embodiments in the drawing, the invention can also be applied to capacitors whose electrodes are formed of self-bearing metal films. Thus the metal films comprise, for example, contacted metal ribbons connected to the metallic terminal elements.

Although various minor changes and modifications might be proposed by those skilled in the art, it will be understood that we wish to include within the claims of the patent warranted hereon all such changes and modifications as reasonably come within our contribution to the art.

We claim as our invention:

1. An electrical wound capacitor with reduced self-inductance, comprising:
    a housing;
    a capacitor winding formed of electrodes and being positioned on a core tube in the housing;
    outer terminals connected to the electrodes via terminal elements positioned in an inside of said housing;
    said terminal elements being substantially radially-symmetrically positioned relative to the capacitor winding and substantially directly above one another, are symmetrical relative to one another, and are electrically insulated from one another; and
    a partially metallized epoxy resin wafer being provided as a terminating plate at one end of the housing.

2. An electrical wound capacitor according to claim 1 wherein said terminal elements are fashioned as strip lines.

3. An electrical wound capacitor according to claim 1 wherein said terminal elements are fashioned as caps.

4. An electrical wound capacitor according to claim 1 wherein the capacitor winding is formed of sub-capacitances concentrically wound on top of one another, connected in series, and separated by insulating separating films.

5. An electrical wound capacitor according to claim 1 wherein a metallic core tube is provided as a coaxial return line for one of the capacitor electrodes.

6. An electrical wound capacitor according to claim 1 wherein a metal foil is provided on an outer generated winding surface of the capacitor winding as a coaxial return line for one of the capacitor electrodes.

7. An electrical wound capacitor according to claim 1 wherein the capacitor electrodes are arranged such that an inner series circuit comprises $C_n$ sub-capacitances where n is an even number.

8. An electrical wound capacitor according to claim 1 wherein a metallization of said terminating plate is positioned at an inside of the plate in a region of the outer terminals and at an edge region of the plate.

9. An electrical wound capacitor according to claim 8 wherein said terminating plate is bonded to said housing.

10. An electrical wound capacitor according to claim 8 wherein said terminating plate is soldered to said housing.

11. An electrical wound capacitor with reduced self-inductance, comprising:
    a housing:
    a capacitor winding formed of electrodes and being positioned in a substantially cylindrical housing such that a central axis of the housing is parallel to a winding axis of the capacitor winding;
    at least one outer terminal at one end of the housing;
    at least one substantially cylindrical cup-shaped metallic connection cap facing the winding and having an outer peripheral edge in contact with an upper face of the winding and connected to an electrode of the capacitor, and a central axis of the connection cap being substantially aligned with the winding axis of the capacitor winding;
    means for connecting the outer terminal to the metallic connection cap; and two cup-shaped metallic connection caps being provided with one concentric to the other and having a smaller diameter, and wherein said capacitor winding comprises two sub-capacitances wound concentrically on one another, each having a connection to a respective one of the connection caps.

12. A capacitor according to claim 11 wherein the cup-shaped connection cap at the peripheral edge having a plurality of indentation means for improved solderability to the capacitor electrode, and wherein said capacitor electrode connects to a Schoopage layer at one end of the capacitor winding.

13. A capacitor according to claim 11 wherein one of the capacitor electrodes connects to a central metallic core tube of the winding via a Schoopage layer at one end of the winding, a second Schoopage layer also being provided at an opposite end of the winding at which the cup-shaped connection cap is soldered.

* * * * *